C. E. TOWNSEND.
CORN BINDER.
APPLICATION FILED SEPT. 17, 1912.
1,107,463.
Patented Aug. 18, 1914.
3 SHEETS—SHEET 1.
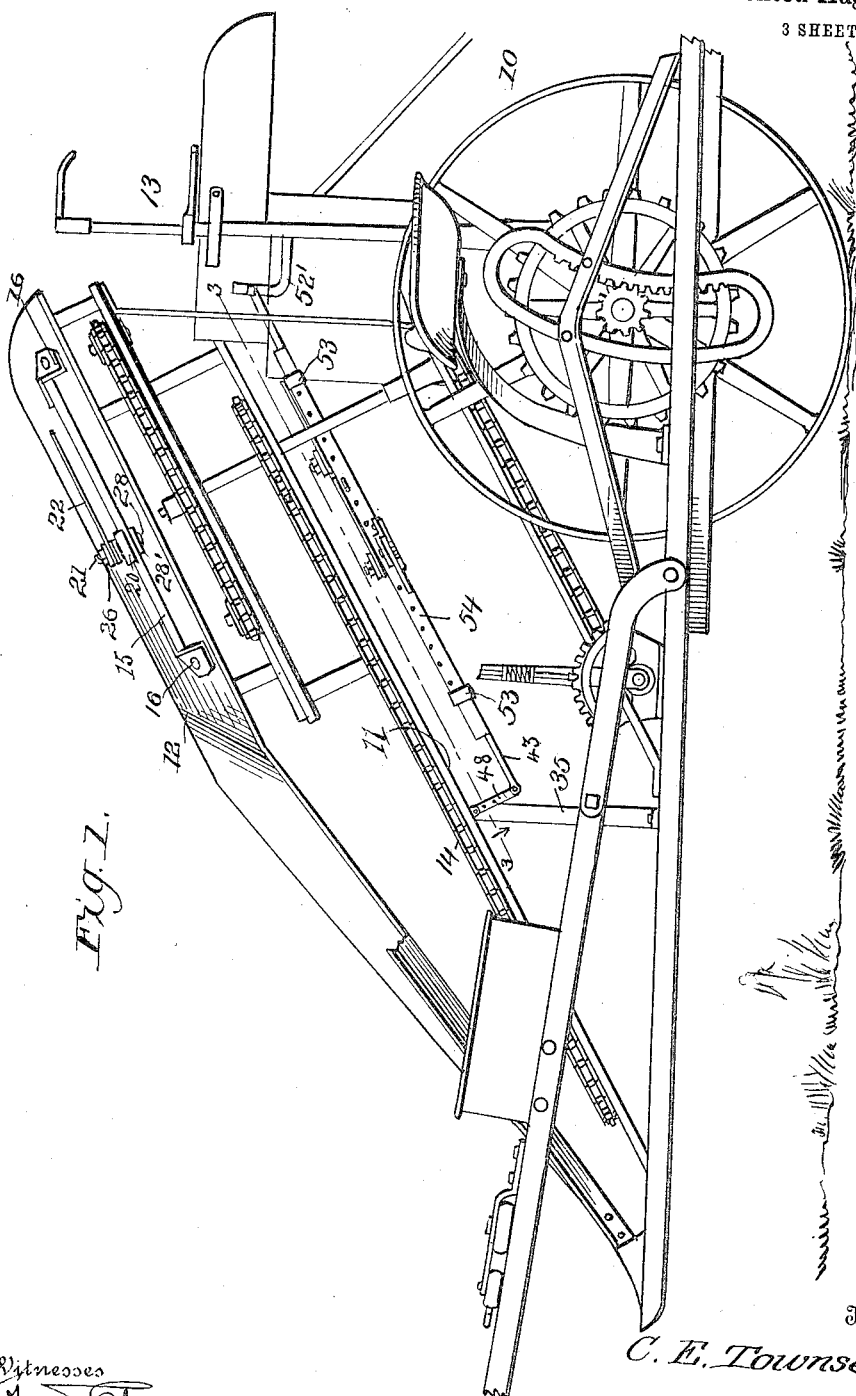
Witnesses
Inventor
C. E. Townsend
By
Attorneys.

C. E. TOWNSEND.
CORN BINDER.
APPLICATION FILED SEPT. 17, 1912.
1,107,463.
Patented Aug. 18, 1914.
3 SHEETS—SHEET 2.
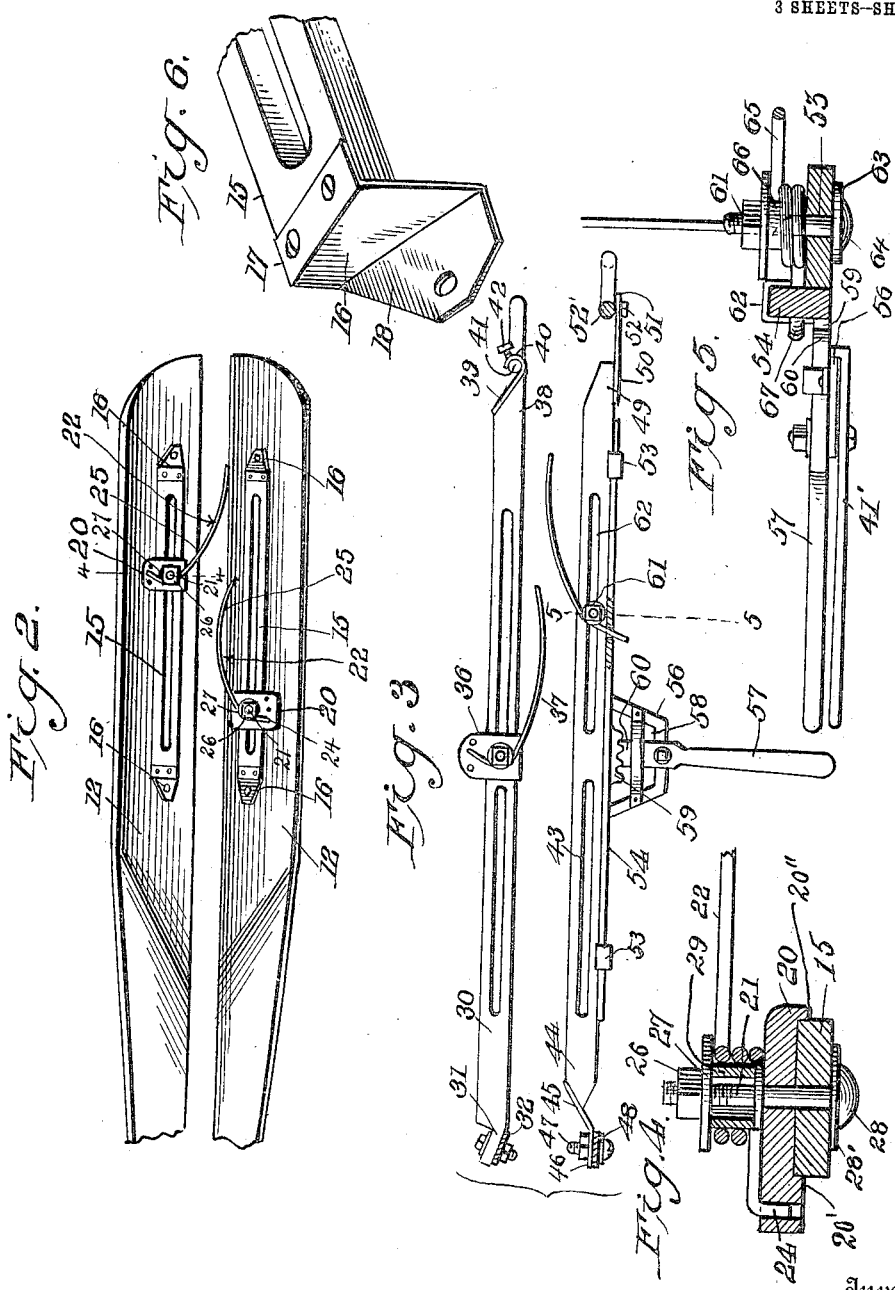
Witnesses
Inventor
C. E. Townsend
By
Attorneys.

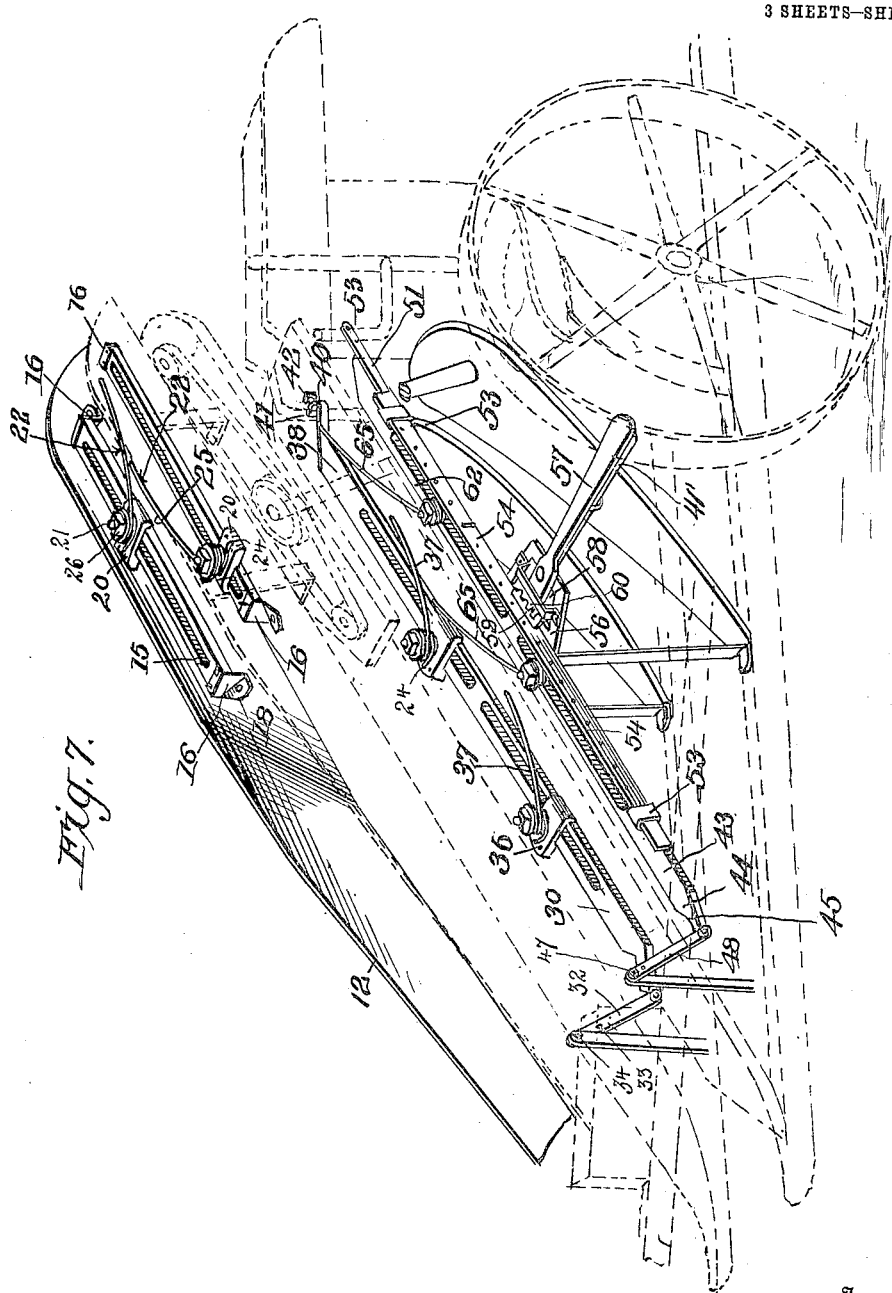

UNITED STATES PATENT OFFICE.

CHARLES E. TOWNSEND, OF LEBANON, NEBRASKA.

CORN-BINDER.

1,107,463.  Specification of Letters Patent.  Patented Aug. 18, 1914.

Application filed September 17, 1912. Serial No. 720,815.

*To all whom it may concern:*

Be it known that I, CHARLES E. TOWNSEND, citizen of the United States, residing near Lebanon, in the county of Redwillow and State of Nebraska, have invented certain new and useful Improvements in Corn-Binders, of which the following is a specification.

This invention relates to an improvement in corn binders.

The primary object of the invention is to provide means for supporting the corn stalks as they are fed to the binding mechanism which will accommodate itself to stalks which vary in length and thickness.

A further object of the invention is to provide a stalk supporting mechanism which may be adjusted into and out of the path of the stalks during their travel toward the binding mechanism.

Another object of the invention is to provide means which will support the stalks from both sides of the conveying mechanism and at different points throughout their lengths.

A still further object of the invention is to provide resilient supporting means the tension of which may be regulated.

In the drawings: Figure 1 is a side elevation of a corn binder of the "McCormick type;" Fig. 2 a top plan view of the upper stalk deflecting members; Fig. 3 a section taken on the line 3—3 of Fig. 1 showing the arrangement of the resilient stalk supports which are secured to the under face of the supporting members for the conveying chains; Fig. 4 is a section taken on the line 4—4 of Fig. 2; Fig. 5 a section taken on the line 5—5 of Fig. 3; Fig. 6 a detail view of one of the brackets which support the upper set of deflecting members; Fig. 7 a perspective view, the shocker being shown in dotted lines.

In the drawings 10 designates a corn binder of the McCormick type which includes the spaced chain supports 11 and the deflectors or guide bars 12 which are supported in superposed relation with respect to the chain supports. It has been found in practice that when the guide bars and chain supports which coact to deflect the stalks toward the shocking mechanism are set in fixed spaced relation, the same will only support stalks which are of certain length and diameter. That is, when long stalks are fed between the guides, the stalks being slender or top-heavy will not be supported in the proper vertical position to be received by the binding mechanism. The present invention, therefore, contemplates means which will resiliently engage the stalks to support them during their travel toward the binding mechanism, the supporting means being adjustable in order that they may accommodate themselves to stalks which vary in thickness and in length.

The guide bars 12, which are supported at an angle with respect to the chain supports, are disposed to contact with the upper portions of the stalks as they are fed toward the binding mechanism 13 by the chains 14. A slotted bar 15 is secured to each of the guide bars 12, said bars 15 being connected to the bars 12 by means of brackets 16, the off-set portions 17 of which are secured to the bars 16, the off-set portions 18 of said brackets being disposed at such angle that the bars 15 are supported at an angle with respect to the bars 12, the edges of the bars 15 being disposed at right angles to the stalks as they are fed by means of the chains 14. The bars 15 support blocks 20, bolts 21 passing through the slots in said bars. These bolts extend through the blocks, a curved stalk supporting spring 22 being coiled about each bolt 21 adjacent one of its terminals. A sleeve 29 is supported by the bolt, the coil spring embracing said sleeve. The terminal 24 of the spring extends within an opening formed in the block 20, the block being provided with a plurality of openings, the terminals thus being adjustable with respect to the block to cause the contacting portion 25 to extend in the path of the stalks. The spring in this manner is regulated to accommodate stalks of different thicknesses.

The bolt 21 receives a nut 26, a plate 27 being interposed between said nut and the spring, the nut maintaining the head 28 in contact with the face of the bar 15 remote from the block, there being a washer 28' interposed between said head and the face of the bar. It will be noted that by loosening the nut the washer will be brought out of binding contact with the bar and the block may be moved longitudinally of the bar, being guided in its movement by the off-sets 20' and 20'', the stalk supports in this manner being adjustable longitudinally of the bar. Thus the stalk supports may be supported at any convenient point throughout the length of the bar resiliently engaging the stalks and holding the same in contact with the stalk directing members, the stalk supports of the two bars being preferably disposed in staggered relation. It will be noted that in practice any number of stalk supports may be supported by the bars consistent with the length of the bars. By this construction, the upper portions of the stalks are effectually supported regardless of their thickness and they may be conveyed to the binding mechanism in a vertical position.

A bar 30 is supported on the under face of the right-hand chain support 11, this support being disposed on the side of the machine remote from the driver's seat. This bar is slotted for the greater portion of its length, the terminal 31 of the bar being reduced in thickness and disposed at an angle with respect to the bar. A supporting link 32 is secured to the terminal 31 of the bar 30, said link being provided with a plurality of apertures 33, a bolt 34 extending through one of said apertures, said bolt passing through the vertical standard 35 which supports the chain supporting member 11, the plate 32 in this manner being adjustable with respect to the member 11. This plate is adjusted when it is desired to adjust the bar 30 to accommodate stalks which vary in length. The plate is provided with one or more blocks 36 which support the curved resilient members 37, said members being adjustable on said blocks as are the stalk supporting members 22 of the upper supports. The terminal 38 of the bar 30 remote from the terminal 31 is cut on an angle and supports a plate 39. This plate is formed with a looped extension 40 which embraces the bar 41 of the frame of the shocker. A set screw 42 passes through said plate permitting the bar 30 to be adjusted with respect to the supporting bar 40 to compensate for the adjustment which is secured by means of the plate 32. It will be noted that the bar 30 is adjustable vertically with respect to the frame of the shocker.

A bar 43, which is substantially of the same construction as the bar 30 with the exception of its terminals, which will be hereinafter described, is supported by the chain support 11 on the left-hand side of the machine adjacent the driver's seat. The terminal 44 of this bar is cut at an angle to receive the plate 45. The terminal 46 of this plate is offset and apertured to receive the bolt 47, the bolt 47 passing through the supporting link 48 which is supported by the vertically extending support 35, said link 48 being provided with a plurality of apertures in order that the terminal 44 of the bar may be adjusted with respect to the frame. The terminal 49 of the bar 43 is provided with a plate 50, the terminal 51 of which is provided with a plurality of apertures, a bolt 52 passing through said apertures and extending within the portion 52' of the frame.

The bar 43 is provided with guides 53 which embrace an apertured bar 54, supporting the same in sliding relation with respect to the bar 43. A plate 56 is secured to the bar 43, said plate pivotally supporting a lever 57, the plate being cut-away at 58 and provided with teeth which receive the latch member 41' which is supported by the lever 57. The bar 54 is provided with a rack 59 with which the toothed terminal 60 of the lever 57 engages, the lever 57 being moved on its pivot to reciprocate the sliding bar 54. A bolt 61 passes through the slot 62 formed in the bar 44, there being a washer 63 disposed between the head 64 of said bolt and the under face of said bar. This bolt supports the curved resilient member 65, said member adjacent its terminal being coiled about the sleeve 66 which is supported on the bolt, the terminal 67 being disposed to enter the aperture in the sliding bar 54. It will be seen that by swinging the lever 57 on its pivot the deflector may be moved into and out of the path of the stalks as the same are fed between the chain supporting members.

From the foregoing it will be noted that two pairs of supporting members are arranged in superposed relation, one pair being supported by the upper deflecting bars of the shocker and the other pair being supported by the chain supports. The upper pair of supports is provided with stalk supports which are adjustable longitudinally and transversely of the supports, the supports in this manner being adjusted to compensate for variation in the length and thickness of the stalks. The lower supporting members are adjustable vertically of the shocker frame to compensate for variation in the length of the stalks, the deflecting members which are arranged on said supports being adjustable longitudinally as well as transversely of the supports.

Having described the invention, what I claim is:

1. A corn binder including superposed supporting members arranged in pairs, the lower pair of members carrying stalk conveying means, said members being spaced to form a stalk passage therebetween, and stalk supports arranged on said members, said supports being capable of adjustment longitudinally of the supports and an adjustment whereby the angle at which they are disposed with respect to the supports may be changed.

2. A corn binder including chain supports, stalk directing members arranged above said chain supports, said stalk directing members and said chain supports being spaced to form a stalk passage therebetween, and resilient stalk engaging means disposed in staggered relation and disposed upon the chain supports and the stalk directing members, said members being capable of longitudinal and angular adjustment.

3. A corn binder including chain supports, stalk directing members arranged above said chain supports, said stalk directing members and said chain supports being spaced to form a stalk passage therebetween, bars supported at an angle with respect to the stalk directing members, said bars being disposed at right angles to the stalks in their line of travel, the bars being slotted, blocks arranged on said bars, bolts passing through each of said blocks, a sleeve arranged on each of said bolts, a stalk supporting member consisting of a resilient strand, one terminal of which projects in the path of the stalks which are fed between the stalk directing members, said stalk supporting member being coiled about said sleeve adjacent its other terminal, said terminal being disposed to extend within an aperture formed in the block, and a nut arranged on said bolt and disposed to maintain said stalk supporting member against movement transversely of the bars.

4. A corn binder including chain supports, bars supported for vertical adjustment on the under face of said chain supports, said chain supports being spaced to form a stalk passage therebetween, resilient stalk engaging members supported by said bars, guides carried by one of said bars, a plate supported by said bar, a lever pivotally supported by said plate, one terminal of said lever being formed with teeth, an apertured bar slidably supported within said guides, said apertured bar being formed with teeth which are disposed to be engaged by the teeth of said lever, and a connection between said sliding bar and the stalk supporting member whereby angular adjustment of the stalk supporting member may be secured by imparting longitudinal movement to the sliding bar.

5. A corn binder including chain supports, bars supported on the under faces of said chain supports, said chain supports being spaced to form a stalk passage, resilient stalk engaging members pivotally supported by said bars, guides supported by one of the bars, an apertured bar slidably supported within said guides, means for moving said bar longitudinally of the bar which supports the same, the terminals of the resilient stalk engaging member which is carried by said supporting bar extending within one of the apertures formed in said sliding bar, the movement of said sliding bar with respect to its supporting bar causing a movement of said stalk engaging member about its pivot to project said member into the path of the stalks.

6. A corn binder including chain supports, stalk directing arms arranged in spaced relation between the chain supports, said chain supports being spaced to form a stalk passage between the stalk directing arms, slotted bars supported on the under face of said chain supports, said bars being capable of vertical movement, resilient stalk supporting members carried by said bars, and means carried by each of the bars for moving each stalk engaging member into and out of the path of the stalks.

In testimony whereof I affix my signature in presence of two witnesses.

CHARLES E. TOWNSEND. [L. S.]

Witnesses:
A. C. T. GEIGER,
GEORGE E. TOWNSEND.

Copies of this patent may be obtained for five cents each, by addressing the "Commissioner of Patents, Washington, D. C."